April 13, 1943.  L. G. SYMONS  2,316,725
VIBRATING SCREEN
Filed Feb. 17, 1940   6 Sheets-Sheet 1
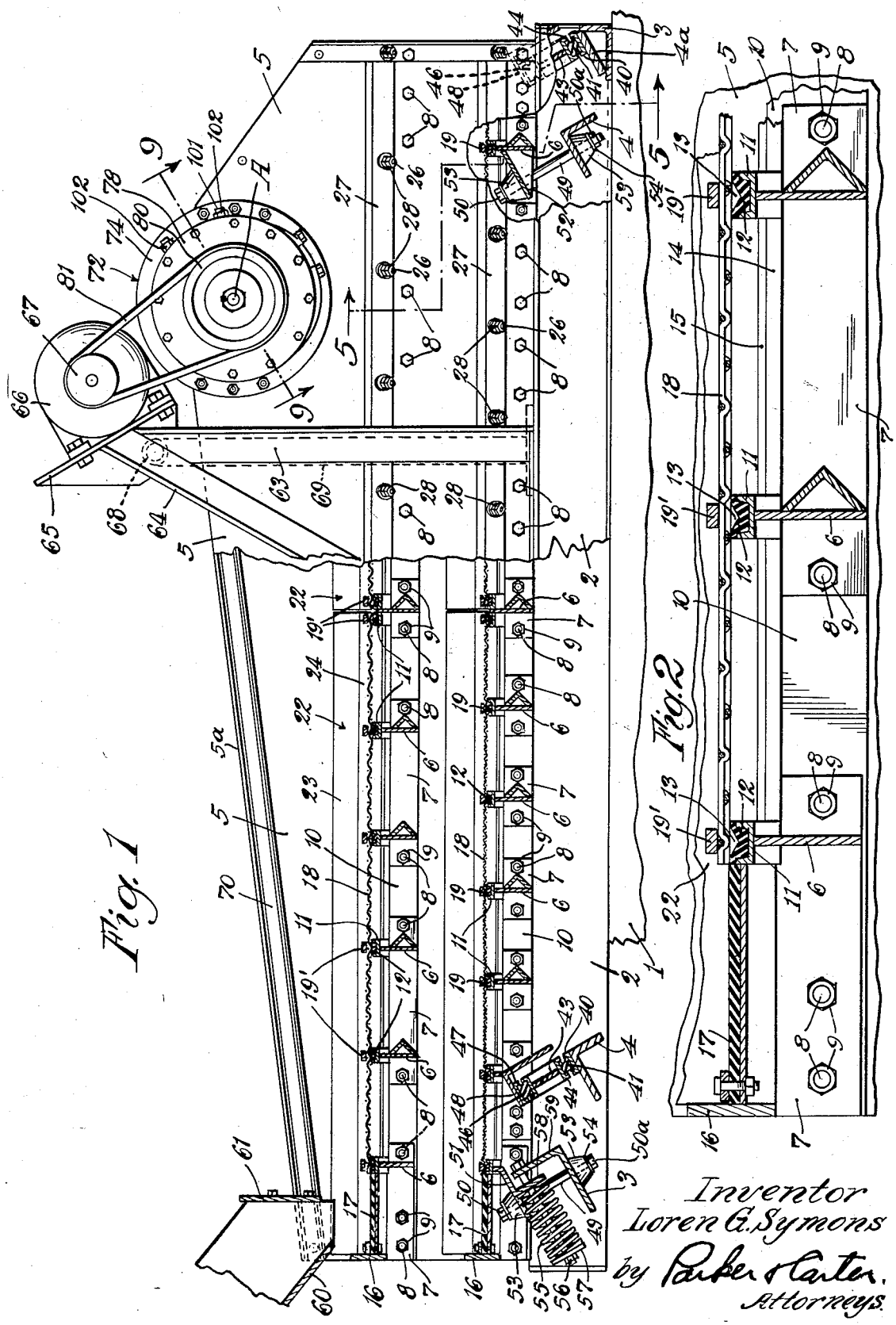
Inventor
Loren G. Symons
by Parker & Carter
Attorneys April 13, 1943.　　　L. G. SYMONS　　　2,316,725
VIBRATING SCREEN
Filed Feb. 17, 1940　　　6 Sheets-Sheet 2
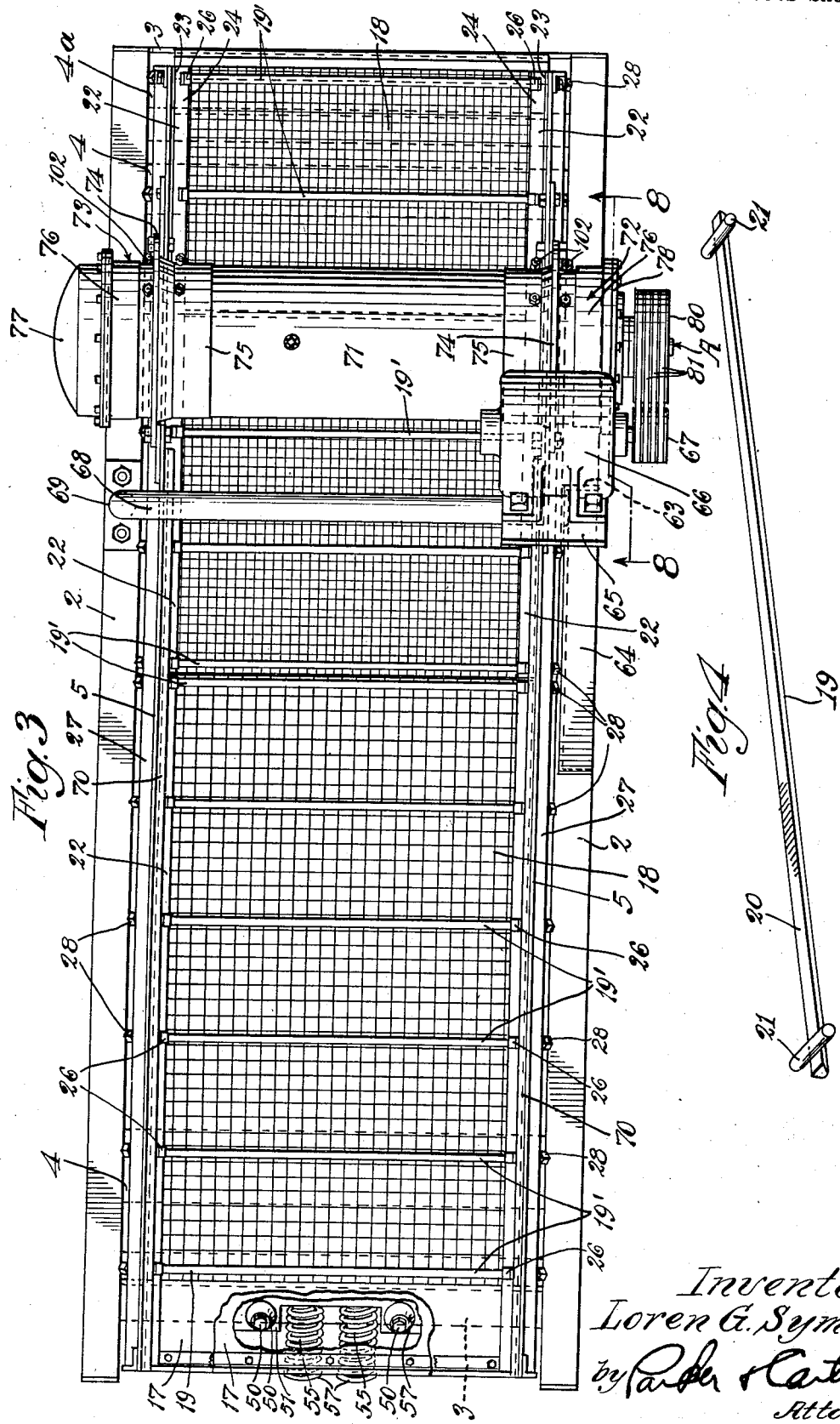
Inventor
Loren G. Symons
by Parker & Carter
Attorneys

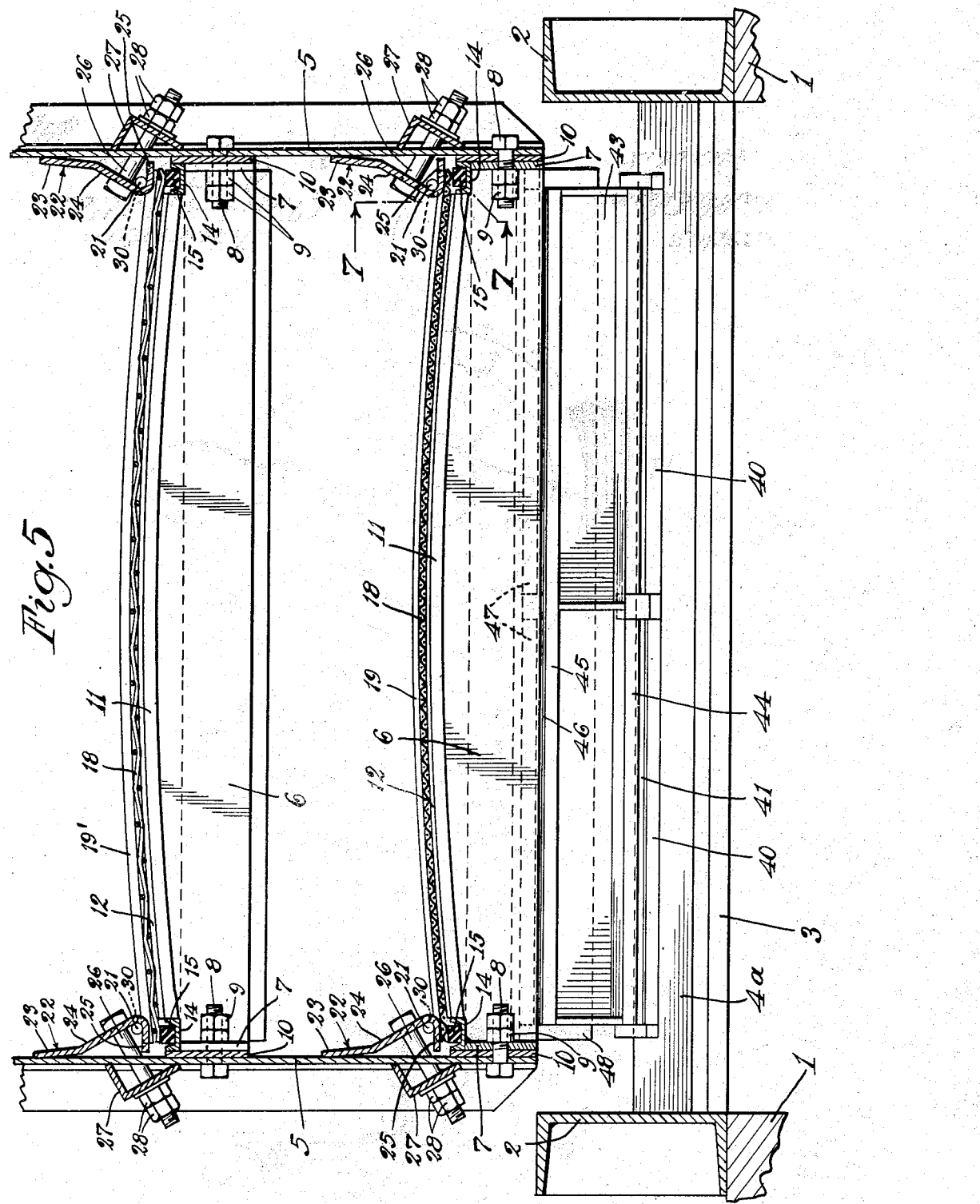

April 13, 1943.  L. G. SYMONS  2,316,725
VIBRATING SCREEN
Filed Feb. 17, 1940  6 Sheets-Sheet 4
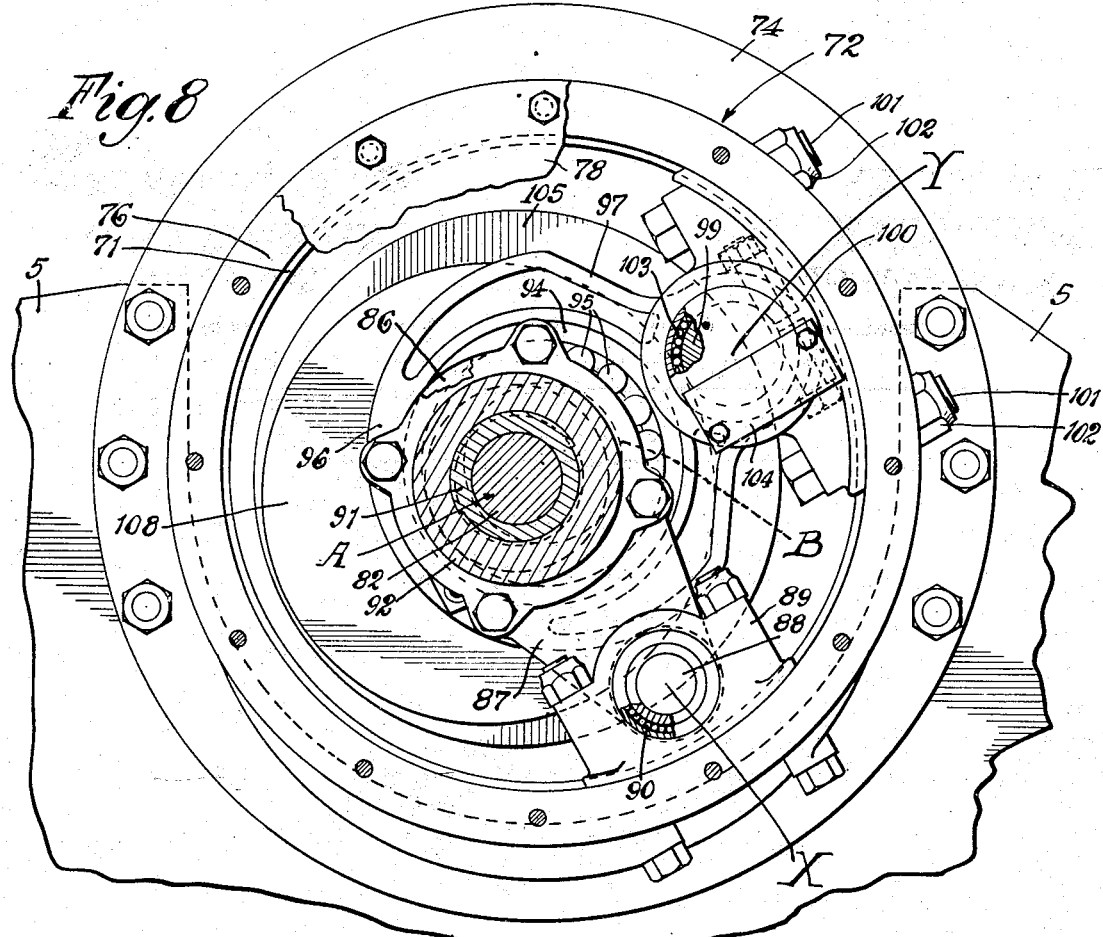
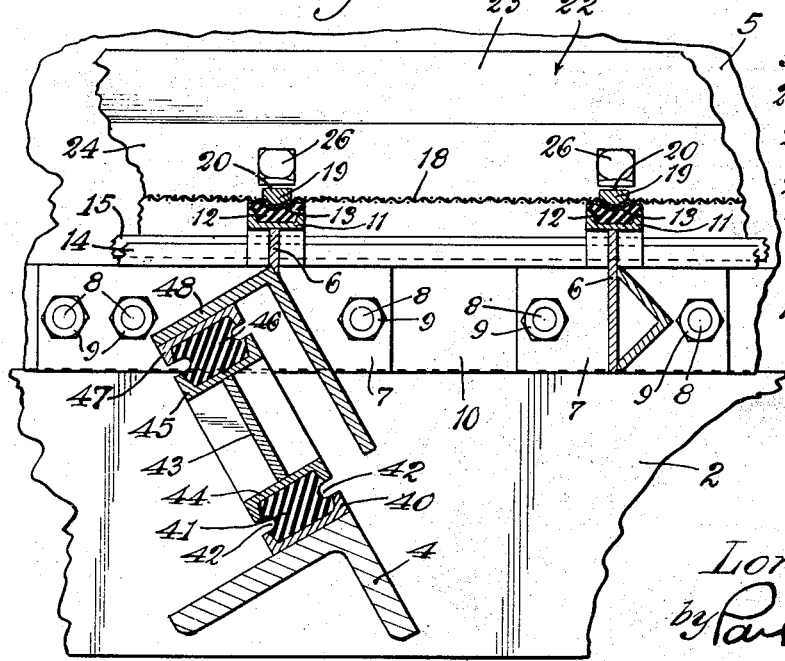
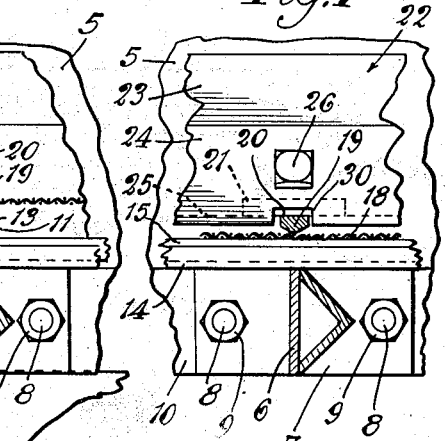
Inventor
Loren G. Symons
by Parker & Carter
Attorneys.

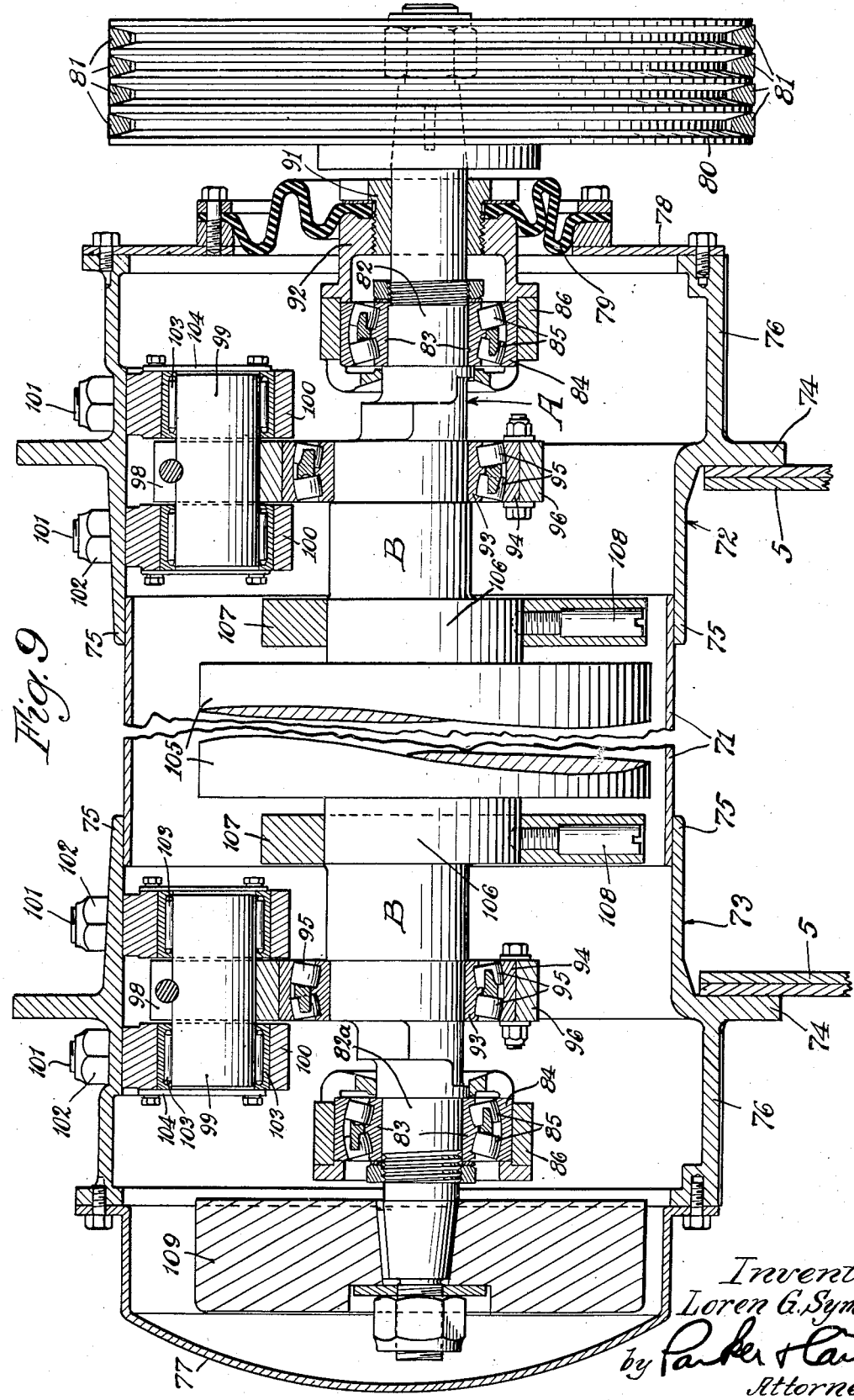

April 13, 1943.  L. G. SYMONS  2,316,725
VIBRATING SCREEN
Filed Feb. 17, 1940  6 Sheets-Sheet 6
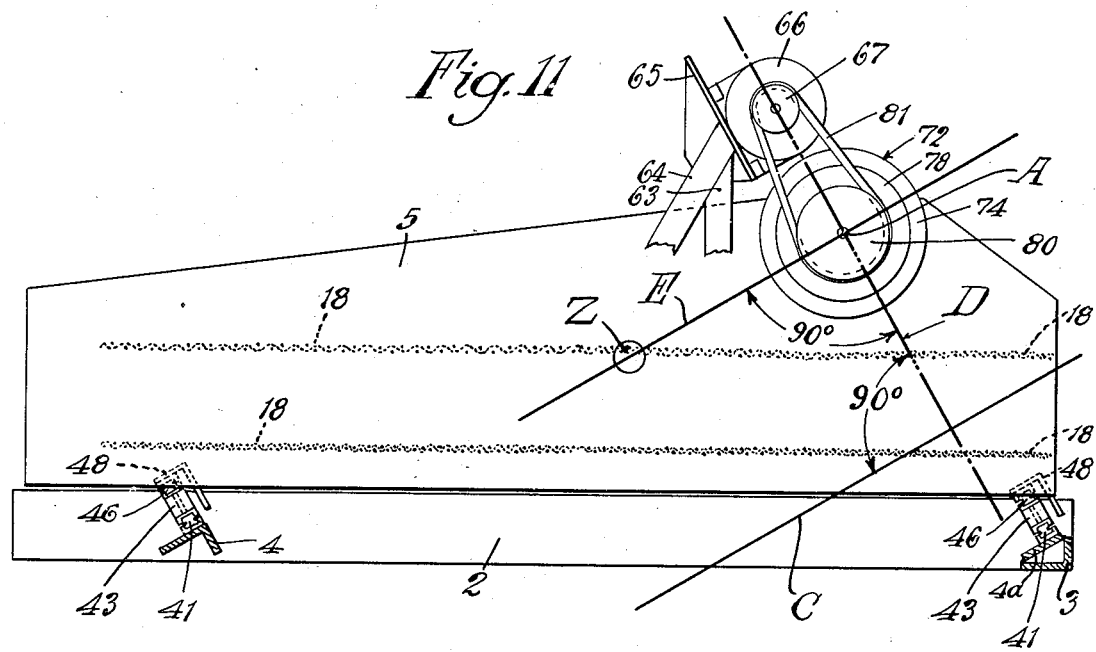
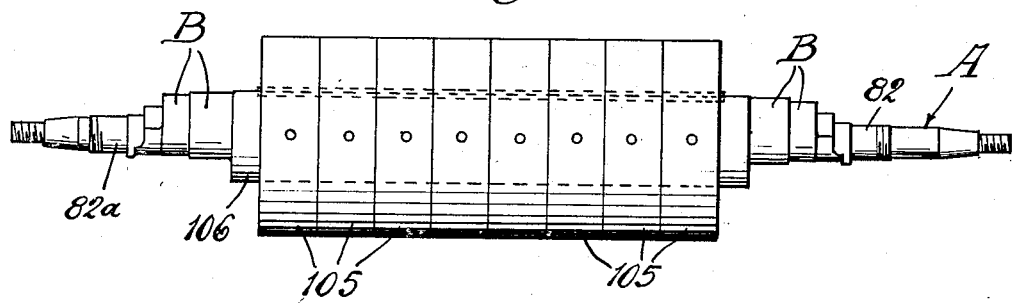
Inventor
Loren G. Symons
by Parker & Carter
Attorneys.

Patented Apr. 13, 1943

2,316,725

UNITED STATES PATENT OFFICE 2,316,725

VIBRATING SCREEN

Loren G. Symons, Hollywood, Calif., assignor to Nordberg Manufacturing Company, Milwaukee, Wis., a corporation of Wisconsin Application February 17, 1940, Serial No. 319,452

28 Claims. (Cl. 209—329)

My invention relates to an improvement in screens and has for one purpose the provision of an improved vibrating or driving mechanism for vibrating a screen.

Another purpose is the provision of improved means for mounting a screen deck and for permitting its vibration.

Another purpose is the provision of improved means for holding the screen cloth or mesh in position upon a deck.

Another purpose is the provision of means for readily varying the amplitude of vibration of the screen deck.

Other purposes will appear from time to time in the course of the specification and claims.

I illustrate my invention more or less diagrammatically in the accompanying drawings wherein:

Fig. 1 is a side elevation with parts in longitudinal vertical section;

Fig. 2 is a partial vertical longitudinal section on an enlarged scale;

Fig. 3 is a plan view;

Fig. 4 is a detail;

Fig. 5 is a section on the line 5—5 of Fig. 1;

Fig. 6 is a partial longitudinal vertical section on an enlarged scale;

Fig. 7 is a section on the line 7—7 of Fig. 5;

Fig. 8 is a section on an enlarged scale on the line 8—8 of Fig. 3;

Fig. 9 is a section on an enlarged scale on the line 9—9 of Fig. 1;

Fig. 10 is a side elevation of the rotor shaft with adjustable weights; and

Fig. 11 is a schematic diagram.

Like parts are indicated by like symbols throughout the specification and drawings.

Referring to the drawings, I indicates any suitable base upon which the screen is mounted. I illustrate a base frame which may include longitudinally extending parallel channel elements 2, 2. These channel elements may be connected by any suitable transversely extending end frame members or angles 3 and intermediate transversely extending angles 4. It will be observed that the intermediate frame elements and the left end members 3, referring to Fig. 1, are tilted somewhat from the horizontal, as shown for example in Fig. 1.

Vibratably mounted upon this base frame is any suitable deck, which may include for example parallel side plates 5, 5, which may be connected by transversely extending frame members 6, which in turn may be welded to side plates 7, which side plates may be bolted or otherwise secured to the side frame members 5, as by bolts 8 and nuts 9. 10, 10 indicate transversely extending reinforcing plates interposed between the side plates 5 and the plates 7.

Referring for example to Fig. 1, the plates may be of sufficient length to carry a plurality of the transverse members 6, whereas in the lower part of the deck I illustrate shorter plates 7, each of which is shown as carrying a single transverse member 6. It will be understood, however, that this is a matter of detail and may be varied to suit conditions. It will be observed that the upper edges of the member 6 are shown as generally arcuate and as carrying upwardly extending channels 11, in which may be positioned blocks of rubber or the like 12, shown as centrally indented or concave as at 13. The purpose of the form of these blocks will later appear.

I also illustrate longitudinally extending channels 14, which may be welded or otherwise secured in relation to the plates 10 and which are made upwardly open to receive longitudinally extending rubber strips 15. I illustrate any suitable transversely extending end cross members 16.

It will be noted that at the feed end of each screening surface I illustrate generally flat horizontal rubber sheets or sections 17, which may be secured in any suitable fashion to the deck structure. 18 generally indicates the screen mesh, which may be applied, if desired, in a plurality of sections or lengths, as shown for example in Fig. 1. In order to clamp this mesh down I employ transversely extending rods 19, each of which may have a convex lower face and a flat or generally flat upper face 20. It will be understood, however, that the shape of these rods may be widely varied, but what is important is that the rod should be so shaped as to tend to penetrate or to force the mesh to penetrate the apertures 13 in the upper surfaces of the transversely extending rubber pad 12.

Where heavy screen is employed, as shown in Fig. 2, a flat bar 19' may be employed in place of the convex-surfaced bar or half round 19. Welded to each end of the members 19 or 19' are transversely extending pins 21.

In order to clamp the rods 19 or 19' against the mesh, I illustrate clamping plates generally indicated as 22, each of which has an upper edge portion 23 adapted to engage the inner face of the side plate 5 of the deck. Extending downwardly and inwardly from it is an inclined portion 24, which terminates in an outwardly turned flange 25, adapted to overlie and engage the upper face of the mesh 18. Clamping bolts 26 extend through the portion 24 and through the side frame members or plates 5 and through inclined clamping angles 27. Any suitable means, such as nuts 28, may be employed to tighten the clamping bolts. It will be observed that the pins 21 are received in the bend formed by the members 24 and 25. Thus, when the clamping plates are tightened up, the entire rod 19 or 19' is subjected to tension and is firmly locked against the upper surface of the mesh 18. If the flat bars 19' are employed, the mesh will simply be locked against the upper surface of the members 12, engaging the upward extending edge portions, as shown in Fig. 2. If a thinner mesh is employed in connection with a downwardly concave rod 19, as shown in Fig. 6, the rod, and with it the mesh, penetrate the hollows 13 of the rubber members 12. It will be understood, of course, that in order to permit the bar 19 or 19' to pass through the clamping members, they may be slotted or cut away as at 30, as shown for example in Fig. 7.

In applying the mesh it is first superposed upon the members 12. The transversely extending bars 19 or 19' are positioned thereover, and the clamping members 22 are applied and then tightened up. In applying fine mesh, as in the form of Figs. 1 and 6, the end rods 19 may, if desired, be tensioned first, and the remaining rods may be tensioned thereafter, or this tightening may be made progressively along the extension of the mesh. In any event, the tightening or clamping action of the rods 19 firmly and evenly secures the mesh in position. The bend put on the mesh by forcing it into the hollows 13 puts a longitudinal tension upon the intermediate sections of the mesh which is independent of any longitudinal tensioning of the mesh as a whole.

It may be convenient to employ a plurality of panel sections, and I have shown two in each deck in Fig. 1.

In order to mount the deck for vibration upon the base, I illustrate a supporting link structure at each end. The structure shown in detail, for example in Fig. 6, illustrates one of the inclined transversely extending angles 4. A similarly inclined plate is illustrated at 4a, at the right-hand end of Fig. 1. It is understood that there is one such link structure at each end of the screen. The link structure proper is shown as including a bottom channel or abutment 40, mounted on the member 4 or 4a, and formed to receive the transversely extending rubber pad 41, which may be made in one or more sections, but which preferably extends transversely substantially or entirely across the width of the deck. The member 41 is shown as having cut-away portions 42 at the sides.

43 is an intermediate web which carries at its lower end the channel 44, and at its upper end the channel 45. The lower channel 44 engages the upper portion of the rubber block 41. The upper channel 45 engages the lower portion of a similar rubber block 46, the upper portion of which in turn is engaged by a channel 47, which is secured to any suitable member, such as the transversely extending deck frame member 48.

Any suitable means may be employed for holding the deck down upon the base and for constraining the deck to a vibratory movement, which may be described as having a uniform radius. I illustrate for example compression bolts 49, headed at each end as at 50, 50a. The lower ends may pass, for example, through the transversely extending frame members 3, 4, on the base, whereas the upper ends pass through corresponding frame members 51, 52 on the deck. Any suitable pads 53 of yielding material may be compressed by the washers 54 against the lower faces of the members 3, 4, and the upper faces of the members 51, 52, respectively. Any suitable compression may be put upon the said compression members. It will be understood, of course, that the apertures through which the bolts 49 pass are of sufficient width to compensate for vibratory movement of the screen deck and to prevent a metal to metal contact.

I also provide means for normally tending to hold the screen in a predetermined neutral position, which preferably is a position in which the link structure, including the web 43, is generally perpendicular to the engaged faces of the members 4 and 4a. Such means may, for example, include a plurality of springs 55 mounted on the bolts 56, having end washers 57, the upper ends of the bolts passing through a web 58 on the member 51 and through a web 59 on the end member 3. It will be understood that the springs 55 resist the gravital tendency of the deck to tilt the members 43, and in effect push the deck against gravity into its predetermined neutral position, which is shown for example in Figs. 1 and 6.

Any suitable means for feeding material to the feed end of the screen may be employed. I illustrate for example a feed chute 60 with a feed limit plate 61. Any other suitable feeding means may be employed, and it will be understood that, if desired, the material may be fed simultaneously to the upper and lower deck, although such disposition is not shown in Fig. 1.

In order to vibrate the screen I illustrate the following structure: Mounted upon the base is an upwardly extending frame structure, which may include for example the vertical frame element 63, the inclined element 64, the motor base 65, secured to the top thereof, the motor 66, and the drive pulley 67 thereof. As shown in Fig. 3, the motor is at one side of the screen structure, and the above described support may be stabilized or held in position by the transversely extending pipe 68, the far end of which extends down to the opposite base frame element, as at 69.

As shown for example in Fig. 1, the side plates 5 have an edge 5a, which inclines upwardly toward the below described power plant. Any suitable reinforcing channel or the like may be employed, as at 70. Connecting the two side plates 5 I illustrate a housing structure, which includes a centrally located tube or tubular housing 71. Fitted upon each end thereof is an annular housing member, generally indicated as 72, 73, each of which has a flange 74, which may be bolted or otherwise secured to the side plates 5. It will be noted from Fig. 9 that the members 72, 73 include inwardly extending cylindrical portions 75, which interfit with the tubular housing 71. They also include outwardly extending cylindrical portions 76 of slightly greater diameter. The outer end of the member 73 may be closed for example by a cap or dome 77. The member 72, which is adjacent or aligned with the motor 66, has its open end partially closed by a plate or ring 78, to which is secured the outer edge of a flexible locking diaphragm or seal 79.

80 illustrates a driven pulley, which may be driven from the motor pulley 67, as by any suitable belt structure 81. The pulley 80 is secured to a rotor shaft generally indicated as A, which has at each end portions 82, 82a, concentric with the pulley 80. These portions 82, 82a are provided with bearing structures including inner roller races 83, outer races 84, and interposed rollers 85. The outer races 84 are held in rings or hubs 86, each of which has a radially outwardly extending arm 87, having a transversely extending pin 88, the ends of which pin are mounted in bearing blocks 89, which are bolted or otherwise secured to the inner face of the portions 76 of the members 72 and 73. Any suitable bearings, such as the needle bearings 90, may be employed. It will be understood, therefore, that the bearing structure which surrounds the portions 82 and 82a may rotate bodily about a center shown at X in Fig. 8.

This structure is identical for both ends of the rotor shaft, except that, since the shaft has to penetrate the open end of the member 76, I illustrate a sealing connection which includes the flexible diaphragm 79, the inner end of which is locked, as shown in Fig. 9, by a plug 81, which is screw-threaded to the opposite locking member 92, which is unitary with or secured to the hub 86. It will be understood that there is a bearing contact between the inner face of the member 91 and the shaft 82, and that the flexible diaphragm 79 serves as a closure for preventing the penetration of dust or grit into the space within the rotor housing above described. The rotor housing is adapted to receive any suitable lubricant for the bearings.

Between the portions 82 and 82a of the rotor shaft A is an eccentric portion generally indicated as B. At each end of this eccentric portion is a second bearing connection between the rotor A and the housing structure. Each such connection may include for example the inner race 93, the outer race 94, and interposed rollers 95. The outer race is held within a hub 96, which extends radially outwardly, as shown in Fig. 8, as at 97. Mounted at the outer end of this extension is a split collar 98, in which is positioned a pin 99, each end of which is received in a sleeve 100, bolted or otherwise secured to the member 72 or 73, as by the bolts 101 and nuts 102. Needle bearings 103 may be interposed between the members 100 and the pins 99. It will be observed that the above mentioned connection between the eccentric portions B is at an angle of about ninety degrees to the connection 87, and Y indicates the center of rotation of the bearing structure above described in relation to the housing. Any suitable retaining plates 104 may be employed to hold the structure of the needle bearings 103 in position.

105 indicates a weight structure concentric with the pulley 80 and the portions 82 and 82a of the rotor. Whereas I illustrate in Fig. 9 this weight as formed integrally with the eccentric portions B of the shaft, it will be understood that it may be made separately therefrom and removable, as illustrated in Fig. 10. For instance, I may employ a weight 105, which may include or be formed of a plurality of annular sections, which may be slipped on and off the central portion of the shaft indicated at 106. The eccentric portion B, the bearings 95, and the connecting rods 96 must be counterbalanced so that the center of gravity of the entire mass coincides with the center of the shaft through the bearings 83. The rings 107 provide such a counterbalancing means. They may be secured in any suitable fashion, for example by set screws 108.

109 is a counterweight located at the opposite end of the rotor from the pulley 80 and concentric therewith. Its purpose is simply to balance the pulley.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing. The use and operation of my invention are as follows:

Considering first the vibrating structure, I illustrate a rotor which is floated within the housing structure, including the parts 71, 72 and 73. It has two bearing connections or groups of bearing connections with the interior of the housing structure. Thus, the bearing structures for the portions 82 and 82a of the rotor A, which are concentric with the pulley 80, rotate bodily about the center or centers indicated at X in Fig. 8. The bearing structures for the eccentric portions B of the rotor shaft A rotate bodily about the center or centers Y. As the motor rotates, the rotor shaft A, through the belts 81 and the pulley 80, the entire shaft, and the weights carried thereby, are rotated. Since the rotor has two connections or sets of connections with the housing, and since the portions 82 and 82a and B are eccentric in relation to each other, the result of the rotation of the rotor is a bodily vibration of the rotor itself and of the shaft, and the weights of the eccentric portion B and of the weights 105. The relationship of the centers X and Y is important in defining and controlling the vibration.

Referring for example to the diagram of Fig. 11, the center of gravity of the whole screen, plus the power plant, is located roughly at Z. The line of movement of the screen is indicated at C. The links 43 serve as supporting rockers for the deck, and, by their construction, allow a large linear vibration. However, the extent and pattern of the linear vibration is defined and controlled by the above described power unit itself. The line between the centers of the motor and the rotor is indicated at D, and the lines C and D are preferably at an angle of about ninety degrees. Another line, parallel with C and indicated at E, passes through the center Z of the screen, and also through the center of the rotor. It also is at an angle of approximately ninety degrees to the line between the centers of motor and rotor. When so disposed, the rotation of the rotor provides a highly efficient screening movement, and there is a minimum or practically substantial elimination of "teetering" or undesired and uncontrolled vibration, and the vibration of the screen is simply a linear or very slightly arcuate movement defined or controlled by the power unit itself.

The amplitude of vibration can be varied by controlling the relation of the weights 105 to the weight of the screen assembly as a whole. If these weights 105 are made in a plurality of sections, as illustrated in Fig. 10, they can be slipped on and off the shaft portion 106 and may be adjusted to suit the particular motion desired, or the particular screening problem involved. Where the service of the screen is uniform, the weights 105 may be fixed permanently or relatively permanently in position, or they may even be formed integrally with the shaft portion B.

Where the same screen may be used for different purposes, or where differences in amplitude of vibration are desired, then it is advantageous to make the weights 105 removable so that a greater or less number of weight elements may be employed, or, if desired, lighter weights may be substituted for the normal heavy weights.

In considering the nature of the vibration and the application of the vibration in the above case in relation to prior practice, it should be noted that, whereas it is customary, for example in unbalanced rotor screens, to set up a circular motion in the vibrating unit and utilize a generally linear vibration resulting therefrom, in the present case the initial vibration is a line vibration. Referring to Figs. 8 and 9, the center of rotation of the weight 105 coincides with the center of the bearing 83, which is at one end of the pivotal link 86. If the link 96 were not employed, the weight 105 and the shaft B would run in true balance in the bearings 83 without causing any vibration whatsoever. As soon, however, as the links 96 are connected up in the position shown for example in Fig. 8, the eccentric portion of the shaft contained within the bearings 95 forces the entire shaft B, the weight 105, the counterweights 107, the pulley 81, and the pulley balance 109, in a substantially linear path, which is really an arc about the center indicated at X in Fig. 8.

The arms 86 act as rockers supporting the shaft and weight and allow the entire unit to move back and forth, as well as to rotate, while the links 96 force a linear vibration on the shaft and act as conventional connecting rods. In effect, the result is simply to force a heavy rotating weight to take up a linear vibration. The resultant reactive forces are used to drive the screen.

Thus the power unit sets up a substantially linear vibration and transmits an opposed linear vibration to the deck. The links or rockers 43 of Fig. 6 do not control or restrict the motion to a linear vibration, but simply support the deck and allow it to take the line vibration set up by the power unit.

The above should be contrasted to earlier practice in which various means are employed for converting rotary vibration to linear vibration, or for constraining a vibrated deck to linear, or generally linear, or approximately linear vibration, in response to rotary vibration or rotation of some eccentric or unbalanced member.

Positioning the vibrating unit upon the screen deck in the manner shown provides a counterbalancing effect. Inasmuch as the reactive forces are created by the fact that the vibrating mass is displaced in one direction, as against the displacement of the mass of the screen in the opposite direction, there results a balance of forces and a more or less complete counterbalancing.

If it were assumed that the bearing 83, which is concentric with the mass 105, were rigidly supported on the bearings resting on the ground, the screen deck would be displaced approximately the angle of the eccentricity B. Due to the fact that the revolving mass may yield to whatever extent its inertia permits, the forces are balanced or divided between the screen deck and the revolving mass, leaving no forces to set up vibration in any other part of the device.

The function of the vibrating unit is, therefore, twofold: That of setting up a vibration of the screen deck, and at the same time counterbalancing any outside forces which could be transmitted to the foundation of the screen.

Upon analysis of the vibration caused by the constant angular velocity of the heavy rotating weight and the very short connecting rod, it will appear that there is a differential motion imparted to the screen deck. Due to the difference in angularity of the connecting rod at the two ends of the stroke, the weight is reversed faster at the farthest point from the pin connection. This in turn causes the deck to reverse much faster at the upper or forward end of its stroke. As a result, rock which would ordinarily stick in the mesh and blind it is not driven into the mesh as tightly as in a screen having uniform action, but is tossed out of the mesh with quite a bit more force than is usually employed. In other words, the lower reversal of direction that tends to stick the rock into the cloth and blind the mesh is in my device more gentle. On the other hand, the upper reversal of direction which tends to free the rock is more severe. This differential action is extremely beneficial in screening sharp or sticky material and tends to relieve the blinding or filling up of the mesh which causes most of the trouble in prior art vibrating screens.

It will be understood that, where I employ the term "single" in the claims in relation to a weight, I wish this term to be interpreted in its dictionary meaning of one weight, as contrasted to more than one. It will be understood, of course, that by the term "single weight," I mean a single weight system in which a weight, single or compound, rotates about a single center.

I claim:

1. In a vibrating unit for screens and the like, a screen deck, a single rotor rotatably mounted on said deck about an axis generally coincident with the center of mass of the rotor, and means for rotating it, said rotor including a plurality of portions eccentric to each other, and radius members in bearing relation with said eccentric portions, said radius members being pivoted to said deck in angular relation to each other, each such radius member including an eye surrounding one of said eccentric portions, an arm extending generally radially outwardly therefrom, and a pivotal connection between the outer end of the arm and the deck.

2. In a vibrating unit for screens and the like, a screen deck, a single rotor rotatably mounted on said deck about an axis generally coincident with the center of mass of the rotor, and means for rotating it, said rotor including a plurality of portions eccentric to each other, and radius members in bearing relation with said eccentric portions, said radius members being pivoted to said deck in angular relation to each other, the angle of separation of said radius members being in the neighborhood of ninety degrees, each such radius member including an eye surrounding one of said eccentric portions, an arm extending generally radially outwardly therefrom, and a pivotal connection between the outer end of the arm and the deck.

3. In a vibrating unit for screens and the like, a screen deck, a single rotor rotatably mounted on said deck about an axis generally coincident with the center of mass of the rotor, and means for rotating it, said rotor having at each end portions eccentric to each other, said portions being arranged in pairs, one member of the pair at one end of the rotor being concentric with a corresponding member of the pair at the opposite end of the rotor, and radius members in bearing relation with said eccentric portions, the radius members for one set of corresponding members of the eccentric portions being pivoted to said deck in angular relation to the radius members for the opposite set.

4. In a vibrating unit for screens and the like, a screen deck, a single rotor rotatably mounted on said deck, and means for rotating it, said rotor having at each end portions eccentric to each other, said portions being arranged in pairs, one member of the pair at one end of the rotor being concentric with a corresponding member of the pair at the opposite end of the rotor, and radius members in bearing relation with said eccentric portions, the radius members for one set of corresponding members of the eccentric portions being pivoted to said deck in angular relation to the radius members for the opposite set, said rotor including a weight, the center of mass of which is generally concentric with one of said sets of corresponding members.

5. In a vibrating unit for screens and the like, a screen deck, a single rotor rotatably mounted on said deck, and means for rotating it, said rotor having at each end portions eccentric to each other, said portions being arranged in pairs, one member of the pair at one end of the rotor being concentric with a corresponding member of the pair at the opposite end of the rotor, and radius members in bearing relation with said eccentric portions, the radius members for one set of corresponding members of the eccentric portions being pivoted to said deck in angular relation to the radius members for the opposite set, the angle of separation of the radius members for the two sets being of the order of ninety degrees.

6. In a vibrating unit for screens and the like, a screen deck, a single rotor rotatably mounted on said deck, and means for rotating it, said rotor having at each end portions eccentric to each other, said portions being arranged in pairs, one member of the pair at one end of the rotor being concentric with a corresponding member of the pair at the opposite end of the rotor, and radius members in bearing relation with said eccentric portions, the radius members for one set of corresponding members of the eccentric portions being pivoted to said deck in angular relation to the radius members for the opposite set, said rotor including a weight, the center of mass of which is generally concentric with one of said sets of corresponding members, the angle of separation of the radius members for the two sets being of the order of ninety degrees.

7. In a vibrating unit for screen decks, a rotor mounted for rotation in relation to said screen deck about a generally horizontal transverse axis, and means for rotating it, said rotor including a weight portion the center of mass of which corresponds generally with the center of rotation of the rotor as a whole, said rotor including a plurality of bearing portions eccentric to each other, one of said bearing portions being generally concentric with the center of mass of the rotor, and radius members in bearing relation with said eccentric portions, said radius members being pivoted to the deck substantially at right angle relation to each other.

8. In a vibrating unit for screen decks, a single weight having a generally horizontal transverse axis, and means for rotating it about an axis generally coincident with the center of mass of the weight, and means for imparting to said weight a generally linear vibration, including radius members pivoted to the deck and in bearing relationship with said weight concentric with its axis of rotation, and additional radius members pivoted to the deck at their outer ends and in bearing relationship with said weight about an axis eccentric to the axis of rotation of the weight, and extending generally at right angles to the first mentioned radius members.

9. In a screen and means for vibrating it, a screen deck, a rotor rotatably mounted on said deck and supported solely on the deck and extending transversely thereacross, and means for rotating it about an axis generally coincident with the center of mass of the weight, said rotor including bearing portions concentric with its axis of rotation, and bearing portions eccentric with its axis of rotation, and radius members in bearing relation with said bearing portions and substantially at right angles to each other, said radius members being pivoted at their outer ends to the deck, said radius members constituting the sole connection between said rotor and the deck.

10. In a screen and means for vibrating it, a screen deck, a single rotor rotatably mounted on said deck and extending transversely thereacross, said rotor including a weight of substantial mass in relation to the mass of the screen deck, the center of mass of said weight being substantially concentric with the axis of rotation of the weight, and means for rotating said rotor, said rotor including bearing portions concentric with its axis of rotation, and bearing portions eccentric with its axis of rotation, and radius members in bearing relation with said bearing portions and substantially at right angles to each other, said radius members being pivoted at their outer ends to the deck, said radius members constituting the sole connection between said rotor and the deck.

11. In a vibrating unit for screens and the like, a screen deck, a housing mounted on and supported entirely upon and extending transversely across said deck and movable unitarily therewith, a single rotor mounted within and supported upon said housing, and means for rotating it, said rotor including a plurality of portions eccentric to each other, and radius members in bearing relation with said eccentric portions, said radius members being pivoted to the interior of said housing substantially at right angles to each other.

12. In a vibrating unit for screen decks, a rotor mounted for rotation in relation to said screen deck about a generally horizontal transverse axis, and means for rotating said rotor, said rotor being entirely supported on the deck, the rotor including a weight portion, the center of mass of which corresponds generally with the center of rotation of the rotor as a whole, means for journaling said rotor for rotation in relation to the deck, including a plurality of angularly related radius members pivoted at their outer ends to the deck and having at their inner ends portions in bearing relation with said rotor, the axes of the connections of the radius members with the rotor being eccentric to each other.

13. In a screen and means for vibrating it, a base, a screen deck, means for vibratably supporting the deck on the base, and means for vibrating the base, including a single rotor rotatably mounted on completely supported on the deck, and means for rotating it, said rotor being generally in balance, and a plurality of angularly related connecting means between the rotor itself and the deck adapted to constrain the rotor to bodily and generally rectilinear oscillation in relation to the deck.

14. In a screen and means for vibrating it, a base, a screen deck, means for vibratably supporting the deck on the base, and means for vibrating the base, including a single rotor rotatably mounted on completely supported on the deck, and means for rotating it, said rotor being generally in balance, and a plurality of angularly related connecting means between the rotor itself and the deck adapted to constrain the rotor to bodily and generally rectilinear oscillation in relation to the deck, along a path inclined to the face of the deck.

15. In a screen and means for vibrating it, a screen deck, and means for vibratably supporting it, a single balanced weight solely and rotatably supported on the screen deck for rotation about a center generally coincident with the center of mass of the weight, means for rotating the weight, and means for constraining the weight to bodily vibration along a substantially rectilinear path at an angle to the path of movement of material across said deck, and a vibration imparting connection between said weight and said deck, including pivoted means for supporting the rotor on the deck, said pivoted means being constructed and arranged to constrain the rotor to vibration along a predetermined path and means for causing said weight to vibrate in response to its rotation along a path in general parallelism with the path of vibration of the deck.

16. In a vibrating unit, a vibrated element, a rotor mounted for rotation in relation to said vibrated element about a generally horizontal transverse axis, and means for rotating said rotor, said rotor being entirely supported upon the vibrated element, the rotor including a weight portion the center of mass of which corresponds generally with the center of rotation of the rotor as a whole, means for journaling said rotor for rotation in relation to said vibrated element, including a plurality of radius members pivoted at their outer ends to the vibrated element and having at their inner end portions in bearing relation with said rotor, said pivoted members being constructed and arranged to constrain the rotor to vibration along a predetermined path in general parallelism with the path of vibration of the deck, means for causing said rotor to vibrate in response to its rotation, and means for constraining the deck to vibrate along a predetermined and generally rectilinear path.

17. In a vibrating unit, a vibrated element, a rotor mounted for rotation in relation to said vibrated element about a generally horizontal transverse axis, and means for rotating said rotor, said rotor being entirely supported upon the vibrated element, the rotor including a weight portion the center of mass of which corresponds generally with the center of rotation of the rotor as a whole, means for journaling said rotor for rotation in relation to said vibrated element, including a radius member pivoted at its outer end to the vibrated element and having at its inner end a portion in bearing relation with said rotor, and an additional eccentric driving connection between said rotor and vibrated element, said additional eccentric connection being constructed and arranged to cause the rotor to swing about the axis of connection of said radius member and said vibrated element.

18. In a vibrating unit, a vibrated element, and means for vibrating it, including a single rotor rotatably mounted on the element, and means for rotating it, the rotor being generally in balance, and a plurality of connecting means between the rotor and the vibrated element, the rotor being rotatable in relation to said connecting means about eccentric axes, said connecting means extending radially outwardly from said rotor to said vibrated element generally at right angles to each other and being rotatably secured at their outer ends to the vibrated element, said connecting means constituting the entire supporting means for the rotor, the rotor being entirely supported upon the vibrated element.

19. In a vibrating unit, a vibrated element, and means for vibrating it, including a rotor rotatably mounted on the element, and means for rotating it, the rotor being generally in balance, a weight on said rotor, and a plurality of radially extending angularly related connecting means between the rotor and the vibrated element, the rotor being rotatable in relation to said connecting means about axes eccentric to each other.

20. In a vibrating unit, a generally tubular housing, a rotor rotatably mounted within said housing generally coaxially with the housing, and means for rotating it, the rotor being generally in balance, a weight on said rotor, and a plurality of radially extending angularly related connecting means extending between the rotor and the housing, the rotor being rotatable in relation to said connecting means about axes eccentric to each other.

21. In a vibrating unit, a generally tubular housing, a single rotor rotatably mounted within said housing generally coaxially with the housing, and means for rotating it, the rotor being generally in balance, and a plurality of connecting means extending between the rotor and the housing, the rotor being rotatable in relation to said connecting means about eccentric axes, said connecting means extending radially outwardly from said rotor to said housing generally at right angles to each other and being rotatably secured at their outer ends to the housing, said connecting means constituting the entire supporting means for the rotor, the rotor being entirely supported upon the vibrated element.

22. In a vibrating unit for screen decks, a rotor mounted for rotation in relation to said screen deck about a generally horizontal transverse axis, and means for rotating said rotor, said rotor being entirely supported on the deck, the rotor including a weight portion, the center of mass of which corresponds generally with the center of rotation of the rotor as a whole, means for journaling said rotor for rotation in relation to the deck, including a plurality of angularly related radius members pivoted at their outer ends to the deck and having at their inner ends portions in bearing relation with said rotor, said radius member being arranged in pairs at each end of the rotor, the axis of the connection of one radius member of each pair with the rotor beig eccentric to that of the other.

23. In a vibrating unit for screen decks, a rotor mounted for rotation in relation to said screen deck about a generally horizontal transverse axis, and means for rotating said rotor, said rotor being entirely supported on the deck, the rotor including a weight portion, the center of mass of which corresponds generally with the center of rotation of the rotor as a whole, means for journaling said rotor for rotation in relation to the deck, including a radius member pivoted at its outer end to the deck and having at its inner end a portion in bearing relation with said rotor, and an additional eccentric driving connection between said rotor and said deck, said additional eccentric connection being such as to cause the rotor to swing about the axis of connection between said first radius member and the deck.

24. In a vibrating unit for screen decks, a rotor mounted for rotation in relation to said screen deck about a generally horizontal transverse axis, and means for rotating said rotor, said rotor being entirely supported on the deck, the rotor including a weight portion, the center of mass of which corresponds generally with the center of rotation of the rotor as a whole, members at each end of said rotor and in which said rotor is journaled, said members being movable in relation to the deck, and an additional direct driving connection between said rotor and said deck, said additional direct driving connection being such as to cause the rotor to swing about the point of connection between said members at the end of the rotor and the deck.

25. In a vibrating unit for screen decks, a rotor mounted for rotation in relation to said screen deck about a generally horizontal transverse axis, and means for rotating said rotor, said rotor being entirely supported on the deck, the rotor including a weight portion, the center of mass of which corresponds generally with the center of rotation of the rotor as a whole, members at each end of said rotor and which said rotor is journaled, said members being movable in relation to the deck, and an additional eccentric driving connection between said rotor and said deck, said additional direct driving connection being such as to cause the rotor to swing about the point of connection between said members at the end of the rotor and the deck.

26. In a screen and means for vibrating it, a base, a screen deck, means for vibratably supporting the deck on the base, and means for vibrating the base, including a single rotor rotatably mounted on the base, and means for rotating it, said rotor being generally in balance, and connecting means between the rotor itself and the deck adapted to constrain the rotor to bodily and generally rectilinear oscillation in relation to the deck, said rotor being entirely supported by said supporting means upon the deck, said supporting means including a plurality of angularly related radius members extending between the rotor and the deck.

27. In a screen and means for vibrating it, a base, a screen deck, means for vibratably supporting the deck on the base, and means for vibrating the base, including a single rotor rotatably mounted on the base, and means for rotating it, said rotor being generally in balance, and connecting means between the rotor itself and the deck adapted to constrain the rotor to bodily and generally rectilinear oscillation in relation to the deck, along a path inclined to the face of the deck, said rotor being entirely supported by said supporting means upon the deck, said supporting means including a plurality of angularly related radius members extending between the rotor and the deck.

28. In a screen and means for vibrating it, a base, a screen deck, and means for vibratably supporting it and for constraining it to vibration along a predetermined and generally rectilinear path, a single, and only a single, weight, and means for constraining said weight to vibrate bodily in a substantially rectilinear direction along a path passing adjacent the center of gravity of the screen deck and intersecting the face of the deck, including pivoted means for supporting the rotor on the deck, said pivoted means being constructed and arranged to constrain the rotor to vibration along a predetermined path, and means for causing said weight to vibrate in response to its rotation along a path in general parallelism with the path of vibration of the deck.

LOREN G. SYMONS.